United States Patent
Zeng

(10) Patent No.: US 7,912,032 B2
(45) Date of Patent: Mar. 22, 2011

(54) SYSTEM AND METHOD FOR COMMUNICATING WITHIN A WIRELESS COMMUNICATION NETWORK

(75) Inventor: Surong Zeng, Altamonte Springs, FL (US)

(73) Assignee: Motorola, Inc., Libertyville, IL (US)

( * ) Notice: Subject to any disclaimer, the term of this patent is extended or adjusted under 35 U.S.C. 154(b) by 1124 days.

(21) Appl. No.: 11/300,529

(22) Filed: Dec. 14, 2005

(65) Prior Publication Data

US 2006/0133342 A1    Jun. 22, 2006

Related U.S. Application Data

(60) Provisional application No. 60/637,364, filed on Dec. 17, 2004.

(51) Int. Cl.
*H04J 3/16* (2006.01)
*H04L 12/43* (2006.01)

(52) U.S. Cl. .......... 370/346; 370/461; 370/235

(58) Field of Classification Search .......... 370/346, 370/461, 235
See application file for complete search history.

(56) References Cited

U.S. PATENT DOCUMENTS

| | | | |
|---|---|---|---|
| 4,445,214 A * | 4/1984 | Reynolds et al. | 370/389 |
| 5,844,905 A | 12/1998 | McKay et al. | |
| 5,943,322 A | 8/1999 | Mayor et al. | |
| 6,404,756 B1 | 6/2002 | Whitehill et al. | |
| 6,405,045 B1 | 6/2002 | Choi et al. | |
| 6,463,286 B1 | 10/2002 | Salminen | |
| 6,556,582 B1 * | 4/2003 | Redi | 370/443 |
| 6,625,118 B1 | 9/2003 | Hadi Salim et al. | |
| 6,704,316 B1 | 3/2004 | He | |
| 6,747,968 B1 * | 6/2004 | Seppala et al. | 370/338 |
| 6,807,165 B2 | 10/2004 | Belcea | |
| 6,839,321 B1 | 1/2005 | Chiruvolu | |
| 6,873,839 B2 | 3/2005 | Stanforth | |
| 7,075,890 B2 | 7/2006 | Ozer et al. | |
| 7,174,170 B2 | 2/2007 | Steer et al. | |
| 7,200,116 B2 | 4/2007 | Kobayashi | |
| 7,280,545 B1 | 10/2007 | Nagle | |
| 7,295,516 B1 | 11/2007 | Ye | |
| 7,542,478 B1 | 6/2009 | Ozer et al. | |
| 7,570,612 B1 * | 8/2009 | Loc et al. | 370/328 |
| 2001/0012272 A1 | 8/2001 | Aubert et al. | |
| 2002/0058502 A1 | 5/2002 | Stanforth | |
| 2002/0080755 A1 | 6/2002 | Tasman et al. | |
| 2002/0122410 A1 | 9/2002 | Kulikov et al. | |
| 2003/0053415 A1 | 3/2003 | Balakrishnan et al. | |

(Continued)

OTHER PUBLICATIONS

The Capacity of Wireless Networks—P. Gupta et at—IEEE Transaction on Information Theory—Issue 2—Mar. 2000—p. 288-404.

(Continued)

*Primary Examiner* — Barry W Taylor

(57) ABSTRACT

A system and method for providing a polling scheme to improve medium access control (MAC) in a multihop wireless communication network (100) comprising nodes (102) and access points (106). When an access point (106) is the source of data packets being transmitted to a neighbor node (102), a collision-avoidance protocol is employed for the communication. However, when the access point (106) is to be the receiver of data packets transmitted from a neighbor node (102), the access point (106) polls the neighbor node (102) by initiating contact with the neighbor node (102) and inviting the neighbor node (102) to send queued data packets to the access point (106). As a result, the polling process allows the access point (106) to gain limited control over its neighbor nodes (102) and increase the efficiency of the network (100).

16 Claims, 4 Drawing Sheets

U.S. PATENT DOCUMENTS

| | | | |
|---|---|---|---|
| 2003/0076781 | A1 | 4/2003 | Enomoto et al. |
| 2003/0115355 | A1 | 6/2003 | Cometto et al. |
| 2003/0142645 | A1 | 7/2003 | Belcea |
| 2003/0189901 | A1 | 10/2003 | Ozugur et al. |
| 2004/0032826 | A1 | 2/2004 | Sridhar |
| 2004/0143842 | A1 | 7/2004 | Joshi |
| 2004/0157613 | A1 | 8/2004 | Steer et al. |
| 2004/0203820 | A1 | 10/2004 | Billhartz |
| 2004/0257996 | A1* | 12/2004 | Choi et al. ............ 370/235 |
| 2004/0258092 | A1 | 12/2004 | Sugaya |
| 2005/0002372 | A1* | 1/2005 | Rune et al. ............ 370/346 |
| 2005/0100035 | A1 | 5/2005 | Chiou et al. |
| 2006/0098677 | A1 | 5/2006 | Ozer |
| 2006/0104232 | A1* | 5/2006 | Gidwani ............... 370/328 |
| 2006/0146704 | A1 | 7/2006 | Ozer et al. |
| 2007/0097941 | A1* | 5/2007 | Le et al. ............... 370/341 |
| 2008/0062880 | A1* | 3/2008 | Yew et al. ............ 370/235 |

OTHER PUBLICATIONS

A Hybrid Network Implementation to Extend Infrastructure Reach—Matthew J. Miller et al—Technical Report—Jan. 2003—12 pages.

MACA—A New channel Access Method for Packet Radio—Phil Karn—ARL/CRRL Amateur Radio 9$^{th}$ Computer Networking Conference—Sep. 1990.

IEEE Stdarard 801.11, 1999 Edition—Part II: Wireless LAN Medium Access Control (MAC) and Physical Layer (PHY) Specifications—9.3 (PCF)—pp. 86-93.

MACA-BI—A Receiver Oriented Access Protocol forWireless Multihop Networks—Fabrizio Talucci et al—PIMRC 1997, Helsinki, Finland—pp. 435-439.

PCT/US05/45228, PCT Search Report-Written Opinion, mailed Nov. 9, 2006, 10 pages.

PCT/US05/45228, International Preliminary Report issued Jun. 19, 2007, 8 pages.

KIPO, "Office Action—Preliminary Rejection," (English Translation) KORS App. No. 1020077016430, Dec. 22, 2008.

KIPO, "Office Action—Last Preliminary Rejection," (English Translation) KORS App. No. 1020077016430, Jul. 20, 2009.

C.Y. Wan et al., "CODA: Congestion Detection and Avoidance in Sensor Networks," SenSys, Nov. 2003, pp. 1-14.

USPTO, Office Action dated Mar. 31, 2009—U.S. Appl. No. 11/300,526—23 pages.

Vaduvur Bharghavan et al., "MACAW: A Media Access Protocol for Wireless LAN's," Association of Computing and Machinery, 1994, pp. 1-9.

Fullmer, C. & Garcia-Luna-Aceyes, J.J., "Floor Acquisition Multiple Access (FAMA) for Packet-Radio Networks," Computer Communication Review, vol. 25, (No. 4), Oct. 1995, pp. 262-273.

Weiser, Mark, "Some Computer Science Issues in Ubiquitous Computing," Comm. ACM, V. 36, N. 7, Jul. 1993, pp. 75-85.

USPTO, Office Action dated Aug. 7 2008—U.S. Appl. No. 11/158,737—20 pages.

USPTO, Office Action dated Dec. 5, 2008—U.S. Appl. No. 11/300,526—18 pages.

USPTO, Office Action dated Sep. 17, 2008—U.S. Appl. No. 11/300,526—26 pages.

USPTO, Office Action dated Apr. 10, 2008—U.S. Appl. No. 11/300,526—25 pages.

* cited by examiner

SYSTEM AND METHOD FOR COMMUNICATING WITHIN A WIRELESS COMMUNICATION NETWORK

This application claims the benefit of U.S. Provisional Application No. 60/637,364, filed Dec. 17, 2004 the entire content of which being incorporated herein by reference.

CROSS-REFERENCE TO RELATED APPLICATIONS

Related subject matter is described in a United States Patent Application Publication Number US20060146704A1 by Sebnem Z. Ozer et al. entitled "A System and Method for Controlling Congestion in Multihopping Wireless Networks", filed concurrently herewith and published on Jul. 6, 2006, and in U.S. Pat. No. 7,542,478 by Sebnem Z. Ozer et al. entitled "A System and Method for Rate Limiting in Multi-Hop Wireless Ad Hoc Networks", issued on Jun. 2, 2009, the entire content of both being incorporated herein by reference.

FIELD OF THE INVENTION

The present invention relates to wireless communication networks and, more particularly, to a system and method for providing a polling scheme to improve medium access control (MAC) in a multihop wireless communication network.

BACKGROUND

In recent years, a type of mobile communications network known as an "ad-hoc" network has been developed. In this type of network, each mobile node is capable of operating as a base station or router for the other mobile nodes, thus eliminating the need for a fixed infrastructure of base stations. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format.

More sophisticated ad-hoc networks are also being developed which, in addition to enabling mobile nodes to communicate with each other as in a conventional ad-hoc network, further enable the mobile nodes to access a fixed network and thus communicate with other mobile nodes, such as those on the public switched telephone network (PSTN), and on other networks such as the Internet. Details of these advanced types of ad-hoc networks are described in U.S. patent application Publication No. US-2002-0058502-A1 entitled "Ad Hoc Peer-to-Peer Mobile Radio Access System Interfaced to the PSTN and Cellular Networks", filed on Jun. 29, 2001, in U.S. Pat. No. 6,807,165 entitled "Time Division Protocol for an Ad-Hoc, Peer-to-Peer Radio Network Having Coordinating Channel Access to Shared Parallel Data Channels with Separate Reservation Channel", granted Oct. 19, 2004, and in U.S. Pat. No. 6,873,839 entitled "Prioritized-Routing for an Ad-Hoc, Peer-to-Peer, Mobile Radio Access System", granted Mar. 29, 2005, now, the entire content of each being incorporated herein by reference.

As can be appreciated by one of ordinary skill in the art, the capacity of multihopping wireless networks diminishes as the number of nodes increases in the network, for example as described in a document by P. Gupta and P. R. Kumar entitled "The Capacity of Wireless Networks," IEEE Transactions on Information Theory, Issue 2, March 2000. In order to increase the capacity of multihopping wireless networks, fixed infrastructure nodes can be introduced as described, for example, in the document by P. Gupta and P. R. Kumar, referenced above, and in a document by M. J. Miller, W. D. List and N. H. Vaidya entitled "A Hybrid Network Implementation to Extend Infrastructure Reach," Technical Report, January 2003. These infrastructure nodes extend the network coverage, provide mobile nodes access to the global Internet, and become the aggregate points for the traffic to and from different mobile nodes. Hence, these infrastructure nodes can become the bottleneck points in the network.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
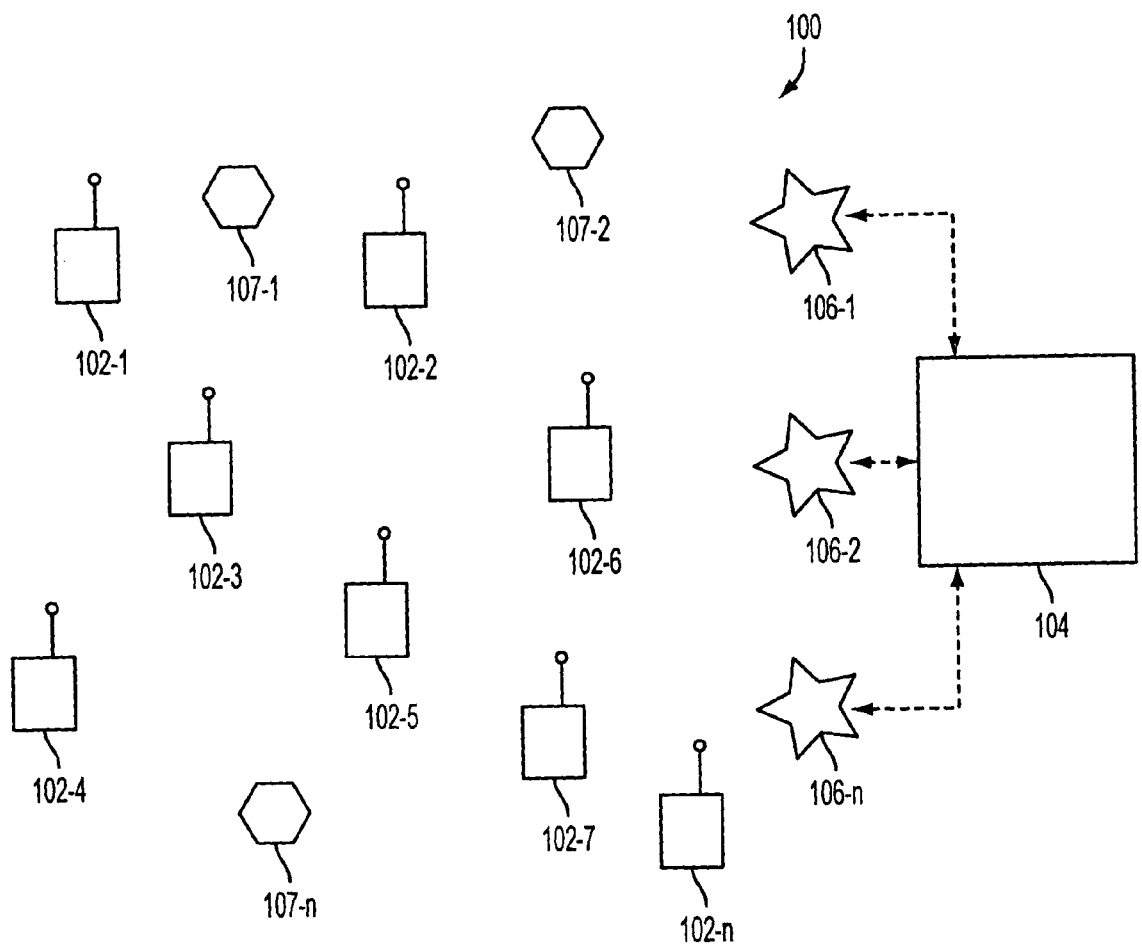
FIG. 1 is a block diagram of an example of a multihopping wireless communication network including a plurality of nodes employing a system and method in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a system and method for providing a polling scheme to improve MAC in a multihop wireless communication network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of a system and method for providing a polling scheme to improve MAC in a multihop wireless communication network as described herein. The non-processor circuits may include, but are not limited to, a radio receiver, a radio transmitter, signal drivers, clock circuits, power source circuits, and user input devices. As such, these functions may be interpreted as steps of a method for providing a polling scheme to improve MAC in a multihop wireless communication network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

As discussed in more detail below, the present invention provides a system and method for providing a polling scheme to improve MAC in a multihopping wireless communication network. In accordance with an embodiment of the polling scheme, a busy infrastructure node controls its receipt of transmissions from neighboring nodes by polling the nodes and initiating communication with individual nodes when the infrastructure node is available to receive transmissions. The busy infrastructure node may employ various patterns for polling the neighbor nodes, such as a successive round-robin method, or a priority method in which a node's priority is determined based upon its load or the type of data that it is transmitting.

FIG. 1 is a block diagram illustrating an example of an ad-hoc packet-switched multihopping wireless communications network 100 employing an embodiment of the present invention. Specifically, the network 100 includes a plurality of mobile wireless user terminals 102-1 through 102-n (referred to generally as nodes 102, subscriber devices (SDs) 102 or mobile nodes 102), and can, but is not required to, include a fixed network 104 having a plurality of access points 106-1, 106-2, . . . 106-n (referred to generally as nodes 106, access points (APs) 106 or intelligent access points (IAPs) 106), for providing nodes 102 with access to the fixed network 104. The fixed network 104 can include, for example, a core local access network (LAN) or wide area network (WAN), and a plurality of servers and gateway routers to provide network nodes with access to other networks, such as other ad-hoc networks, the public switched telephone network (PSTN) and the Internet. The network 100 further can include a plurality of fixed routers 107-1 through 107-n (referred to generally as nodes 107, fixed routers 107 or wireless routers (WRs) 107) for routing data packets between other nodes 102, 106 or 107. It is noted that for purposes of this discussion, the nodes discussed above can be collectively referred to as "nodes 102, 106 and 107", or simply "nodes".

As can be appreciated by one skilled in the art, the nodes 102, 106 and 107 are capable of communicating with each other directly, or via one or more other nodes 102, 106 or 107 operating as a router or routers for packets being sent between nodes, as described in U.S. patent application Publication No. US-2002-0058502-A1, and U.S. Pat. Nos. 6,807,165 and 6,873,839, referenced above.

Figure 2:
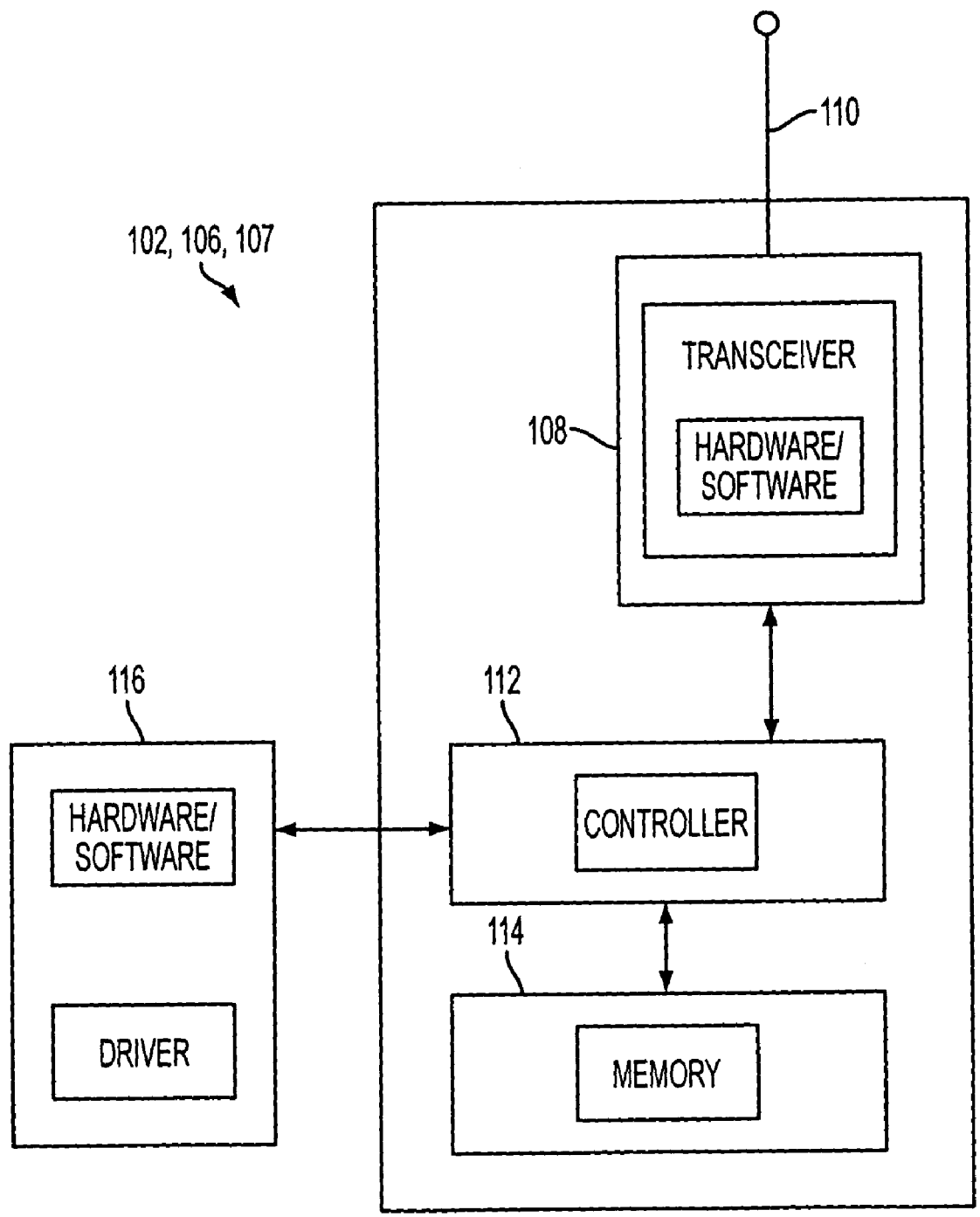
FIG. 2 is a block diagram illustrating an example of a node employed in the network shown in FIG. 1.

As shown in FIG. 2, each node 102, 106 and 107 includes at least one transceiver, or modem 108, which is coupled to an antenna 110 and is capable of receiving and transmitting signals, such as packetized signals, to and from the node 102, 106 or 107, under the control of a controller 112. The packetized data signals can include, for example, voice, data or multimedia information, and packetized control signals, including node update information.

Each node 102, 106 and 107 further includes a memory 114, such as a random access memory (RAM) that is capable of storing, among other things, routing information pertaining to itself and other nodes in the network 100. As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included.

As can be appreciated by one skilled in the art, a technique known as Multiple Access with Collision Avoidance (MACA) is a type of MAC protocol commonly used in a multihopping wireless communication network. An example of the MACA protocol is described in an article by Phil Karn entitled "MACA-A New Channel Access Method For Packet Radio," ARL/CRRL Amateur Radio $9^{th}$ Computer Networking Conference, Sep. 22, 1990. Under the typical process for MACA and its variations, a node 102, 106 or 107 attempting to transmit a packet to a receiving node 102, 106 or 107 first sends a request-to-send (RTS) message to the receiving node 102, 106 or 107. Upon receiving the RTS successfully, the receiving node 102, 106 or 107 responds with a clear-to-send (CTS) message. The RTS and CTS messages contain information which includes source/destination addresses, transmission duration, and so on, relating to the intended packet transmission. Therefore, all nodes 102, 106 and 107 that receive the RTS and CTS messages will refrain from transmitting long enough to avoid collision with the node 102, 106 or 107 attempting to transmit the packet.

The transmitting node 102, 106 or 107 then transmits the packet upon receiving the CTS successfully, and the receiving node 102, 106 or 107 responds with an acknowledgment (ACK) message for the successful transmission to complete the transaction. In the case of a collision or unsuccessful transmission due to, for example, a bad channel condition, a random transmission delay value is increased progressively until a successful transmission occurs, and the delay value is then reset to the minimal value. In this case, the MACA-type protocols handle the automatic repeat request (ARQ) by repeating the entire RTS/CTS exchange and therefore, large transmission delays are incurred during the retransmissions.

A single-channel MACA protocol can be extended to the multi-channel MAC as can be appreciated by one skilled in the art. In such a multi-channel MAC, one channel is reserved for the transmission of control packets such as RTS and CTS, and other channels are used for data packet transmission. The typical process is described below.

In a multi-channel MAC process, all nodes 102, 106 and 107 in the network 100 monitor the reservation channel. Before data packet transmission, RTS and CTS message are exchanged between the source and destination nodes 102, 106 or 107 via the reservation channel. The RTS and CTS messages include information pertaining to the source/destination addresses and transmission duration, as well as information identifying the selected data channel. Once the RTS/CTS exchange is successful, both the transmitting and receiving nodes 102, 106 or 107 tune to the selected data channel so that the data packet and ACK message can be exchange. When the transmitting node 102, 106 or 107 receives the ACK message, the transmitting and receiving nodes 102, 106 and 107 retune back to the reservation channel to prepare for future transmissions. If a collision or otherwise unsuccessful transmission occurs, a backoff process similar to that which is in typical MACA will be performed to resolve the collision. For broadcast communications, before data packet transmission, the transmitting node 102, 106 or 107 transmits a RTS message over the reservation channel as can be appreciated by one skilled in the art. The RTS message includes the pre-defined broadcast address information and transmission duration information, as well as information identifying the selected data channel. All neighbor nodes 102, 106 and/or 107 that receive this RTS message will tune to the selected data channel to receive the data packet. The transmitting node 102, 106 or 107 then transmits the data packet on the selected data channel without waiting for a CTS from any neighbor node 102, 106 or 107, and no ACK message is required from any receiving node 102, 106 or 107.

In some multihopping networks, most of the traffic will pass through an infrastructure node, such as an AP 106, to reach the final destination. In certain MACA-type MAC protocols, communications are initiated by a node 102, 106 or 107 transmitting an RTS message to the link layer communication destination, which is the next hop node 102, 106 or 107 on the multi-hop path. However, if the next hop destination is an AP 106 and the AP 106 is busy, the RTS message cannot be received by the busy AP 106. As can be appreciated by one skilled in the art, the possibility of this occurring is high in multi-channel MAC networks. Also, if many neighbor nodes 102, 106 or 107 of the AP 106 try to send messages to the same AP 106 at the same time, the possibility of an RTS message collision will be very high, especially when some of those neighbor nodes 102, 106 or 107 are "hidden nodes" with respect to each other, meaning that they are unaware of each others existence. Accordingly, certain neighboring nodes 102, 106 or 107 can enter a backoff state which, in turn, seriously reduces the efficiency of the network 100 and worsens the bottleneck problem in APs 106.

A section of the Institute of Electrical and Electronics Engineers (IEEE) 802.11 Standard entitled "Part 11, Wireless LAN Medium Access Control (MAC) and Physical Layer (PHY) Specifications," ANSI/IEEE Standard 802.11, 1999 Edition, (ISO/IEC 8802-11:19999(E)), describes a Point Coordinate Function (PCF) polling scheme to improve the MAC efficiency. In accordance with the PCF polling scheme, the AP 106 polls the other neighboring nodes 102, 106 or 107 for data transmission. However, as can be appreciated by one skilled in the art, the PCF polling scheme is generally applicable to a one-hop system with a single-channel MAC, and thus is not suited for a multihopping wireless communication network with multi-channel MAC.

A document by F. Talucci, M. Gerla and L. Fratta entitled "MACA-BI (MACA by invitation): A receiver oriented access protocol for wireless multi-hop networks," PIMRC '97, Helsinki, Finland, Sep. 1-4, 1997, presents a scheme to reverse the collision avoidance handshaking in MACA-type MAC protocols. In MACA-BI, the communication is initiated by the intended receiving node 102, 106 or 107. That is, the receiving node 102, 106 or 107 transmits a Ready to Receive (RTR) message to invite the transmitting node 102, 106 or 107 to transmit the data packet.

However, as can be appreciated by one skilled in the art, this protocol is unsuitable for use in a multihopping wireless network with multi-channel MAC for several reasons. For example, the protocol does not require a transmitting node 102, 106 or 107 to respond to an RTR message with any short control message to negotiate the transmission duration and the transmission channels, which thus leads to low success probability of receipt of an RTR message and results in collisions due to the lack of information in the RTR. Additionally, without responding to an RTR with a short control message from the transmitting node 102, 106 or 107, the neighbor nodes 102, 106 or 107 of the transmitting node 102, 106 or 107 which are not neighbors of the receiving node 102, 106 or 107 cannot be prevented from sending an RTR message to other nodes 102, 106 or 107 in the area of the transmitting node 102, 106 or 107. Thus, the probability of collisions between new RTR message and the ACK message from the node 102, 106 or 107 that is trying to complete on-going communication is high. Also, this protocol lacks synchronization between the transmitting and receiving nodes 102, 106 or 107 and hence, the protocol is not efficient for use in a single-channel or multi-channel MAC multihopping wireless network.

As discussed in more detail below, the embodiments of the present invention described herein address the above shortcomings by providing a system and method for improving MAC efficiency in bottleneck points, such as APs 106, and providing QoS support in multihopping wireless communication networks, such as that shown in FIG. 1. Unlike the existing MACA protocol and its variations in which communication is initiated by the transmitting node 102, 106 or 107 as discussed above, a busy receiving node, such as an AP 106, operating in accordance with the present invention initiates unicasting communications with its neighbor nodes 102, 106 and/or 107 based on its own status. By reversing the communication initiation process, the AP 106 obtains a limited central control capability to coordinate its neighboring nodes' behavior. By employing this polling scheme, the network 100 avoids or at least reduces collisions that would occur if a number of the AP's neighbor nodes 102, 106 and/or 107 that may be hidden from each other concurrently tried to access the busy AP 106.

Additionally, this scheme ensures that the AP 106 does not miss RTS messages from other nodes 102, 106 and/or 107 while it is busy communicating with another node 102, 106 or 107. As can be appreciated by one skilled in the art, the missing RTS message problem is more serious in multi-channel MAC networks because the busy AP 106 may be tuned to a different data channel for communication while surrounding nodes 102, 106 and/or 107 are attempting to contact the AP 106 on the reservation channel and thus, the AP 106 will not receive the RTS messages. However, according to the present invention, when the busy AP 106 initiates communication, the bottleneck problem can be mitigated and the busy AP 106 will not be overwhelmed by messages from its neighboring nodes 102, 106 and/or 107. In addition, the polling scheme according to the present invention provides scheduling algorithms that can be easily deployed to address the fairness problem in the MACA type MAC protocol and provide QoS support to different applications.

As will now be discussed in more detail, according to an embodiment of the invention, short control messages, such as RTS, CTS and ACK messages, are used to distribute the source and destination address information, as well as information pertaining to a transmission duration, traffic load, traffic type, and the selected data channel for multi-channel MAC. In addition, the RTS and CTS messages also contain a flag to indicate that they are reversed RTS and CTS messages, referred to as a reverse RTS (RRTS) message and a reverse CTS (RCTS) message.

In an embodiment of the present invention, each node 102, 106 and 107 also broadcasts a Neighbor Advertisement (NA) message or beacon message periodically to inform other nodes 102, 106 and 107 of its existence. Also, every node 102, 106 and 107 maintains a neighbor list to record the identities of its neighbor nodes 102, 106 and/or 107 based on the received NA messages. For such broadcast NA messages, the normal MAC algorithm is used so that the nodes 102, 106 and 107 and, in particular, the APs 106, can obtain the neighbor information that is required to maintain an accurate neighbor list. The broadcast process is initiated by the sender node 102, 106 and 107 by transmitting an NA message directly for a single channel MAC, or by transmitting a normal RTS prior to transmitting the NA message in a multiple channel MAC.

Figure 3:
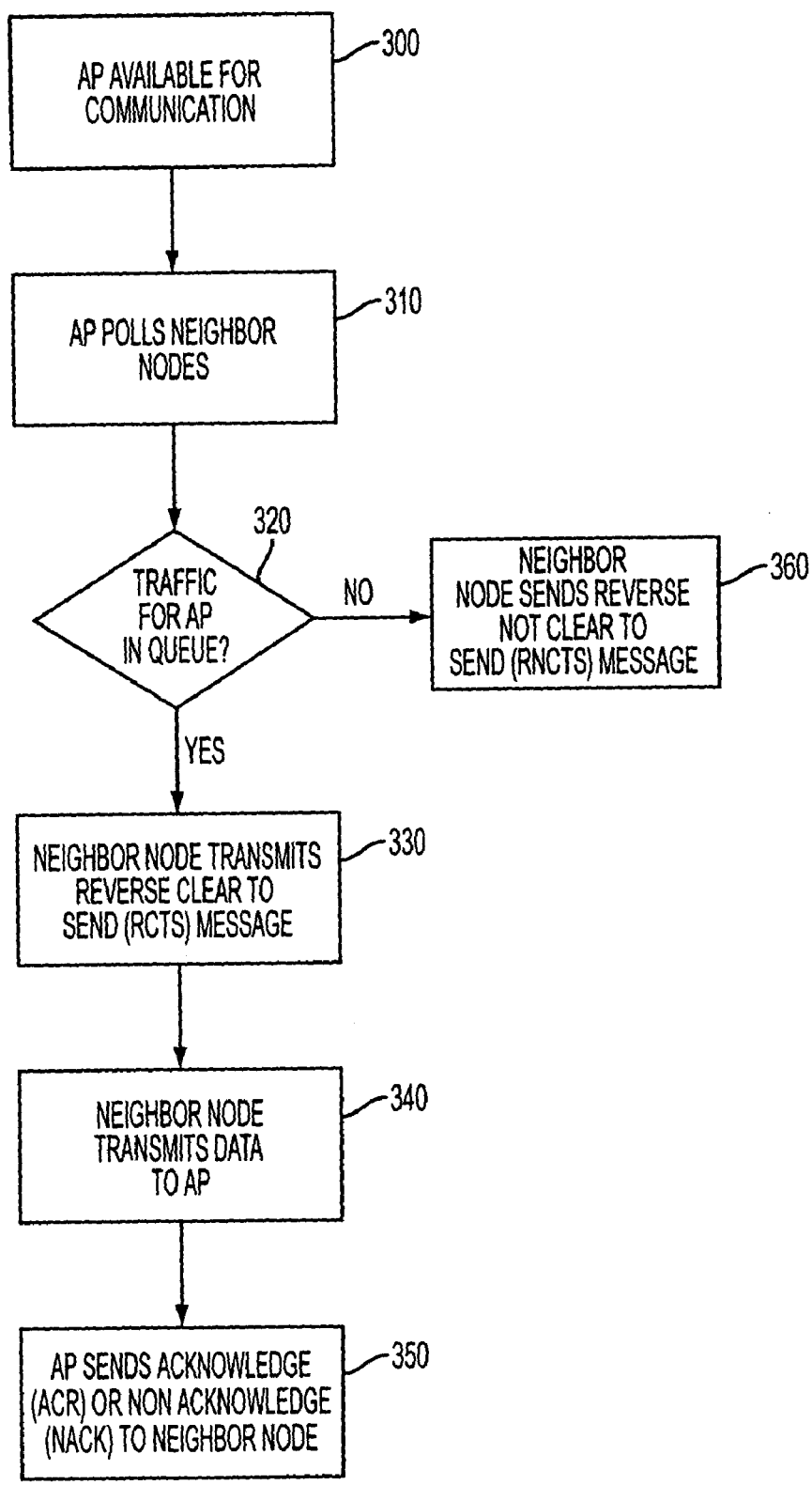
FIG. 3 is a flowchart showing an example of operations performed for communicating between an access point and nodes in the wireless communication network shown in FIG. 1 according to an embodiment of the present invention.

As shown in the flowchart of FIG. 3, when an AP 106 is available for communication in step 300, the AP 106 polls its neighbor nodes 102, 106 and/or 107 in step 310 by systematically sending an RRTS to each of its neighbor nodes 102, 106 and/or 107 to determine whether any neighbor wants to send traffic to the AP 106 and, if so, the AP 106 then initiates the communication. For example, when a neighbor node 102 (or node 106 or 107) receives the invitation to transmit data to the AP 106, the neighbor node 102 checks its local queue for data traffic to the AP 106 in step 320. If the neighbor node 102 has data traffic to send to the AP 106, the neighbor node 102 replies with an RCTS in step 330. Similar to the communications in a conventional MACA protocol, both the RRTS and RCTS messages contain information pertaining to the source/destination node addresses, transmission duration, packet information, and information identifying the selected data channel for multi-channel MAC. After transmitting the RCTS, the neighbor node 102 transmits the data message on the selected channel in step 340, and the AP 106 replies with an ACK to complete the transaction if the AP 106 successfully receives the data packet in step 350. However, if the neighbor node 102 determines in step 320 that it does not have traffic to send to the AP 106, the neighbor node 102 sends a reversed Negative-Clear-To-Send (RNCTS) in step 360 to indicate to the AP 106 that no data packet is going to be transmitted.

It should be understood by one skilled in the art that the above operations, as well as the operations discussed below, can be performed by the controller 112 and related hardware and software of the access point 106 and the other nodes 102 and 107 as appropriate.

As also discussed above, according to an embodiment of the present invention, the AP 106 initiates all unicast communications. As can be appreciated by one skilled in the art, two cases for unicast communications exist.

In the first case, the AP 106 is the source and one of its neighbors (e.g., a node 102) is the destination. In such a case, the AP 106 employs conventional MACA-type collision avoidance handshaking protocol. That is, the AP 106 sends an RTS message to the receiver node 102, the receiver node 102 responds with a CTS message, and then the AP 106 and receiver node 102 exchange the data and ACK message.

In the second case, the AP 106 is the destination, and one of its neighbor nodes (e.g., a node 102) is the source. In this case, although the AP 106 is the receiver, the AP 106 is responsible for initiating the communication by sending an RRTS message for receipt by the neighbor node (e.g., node 102) that is the source. An example of a method by which AP 106 contacts its neighbors in order to receive data from them is further described in the following paragraphs.

Figure 4:
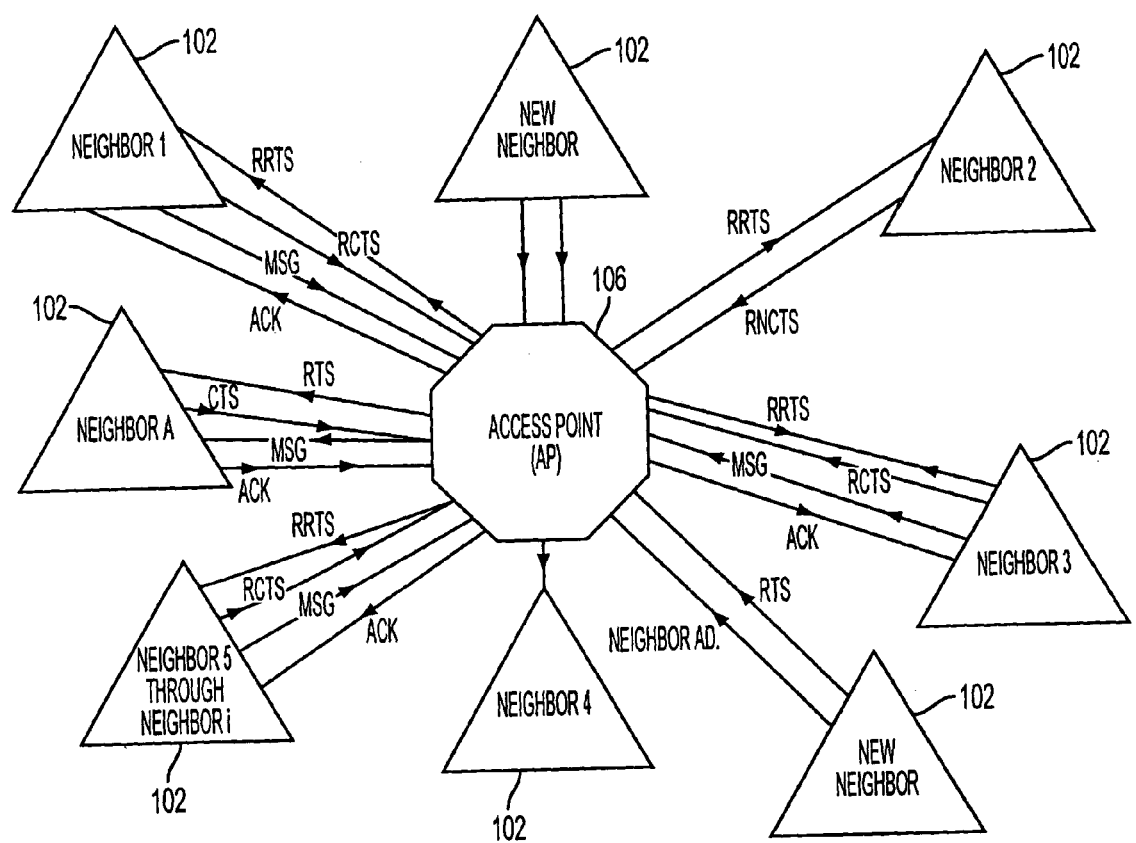
FIG. 4 is a conceptual diagram illustrating an example scenario of a polling operation performed by an access point in the network shown in FIG. 1 in accordance with an embodiment of the present invention.

According to an embodiment of the invention, an AP 106 can use a round-robin polling scheme to poll neighboring nodes. For purposes of this discussion, it will be assumed that each neighbor is a node 102, however, any type of node can be a neighbor node. In a round-robin polling scheme as shown, for example, in FIG. 4, the AP 106 consecutively polls its neighbor nodes 102, so that the AP 106 can receive whatever communications that a neighbor node 102 may have in its queue for transmission to the AP 106. FIG. 4 further illustrates examples of communications that may occur during a round-robin polling scheme according to an embodiment of the present invention.

When the AP 106 is available, the AP 106 starts polling its neighbor nodes 102. In this example, it is assumed that there are "i" number of neighbor nodes 102. First, the AP 106 transmits an RRTS message to Neighbor 1 to indicate that the AP 106 is available to receive a packet. There are three potential conditions.

If Neighbor 1 is free and has traffic to send to the AP 106, then Neighbor 1 replies with a RCTS message to the AP 106. Following the RCTS message, Neighbor 1 transmits the data packet message (MSG). If the AP 106 successfully receives the packet, the AP 106 replies to Neighbor 1 with an ACK message, and the AP 106 then can continue the polling process with another neighbor. This exchange is shown in FIG. 4.

Alternatively, if Neighbor 1 does not have any packet to send, Neighbor 1 replies to the AP 106 with a RNCTS, and the AP 106 then continues on to poll the next neighbor. On the other hand, if Neighbor 1 is busy and misses the polling RRTS, then the AP 106 continues to poll its next neighbor following the expiration of a time-out period.

When appropriate, the AP node 106 may pause its polling process to perform other functions. For example, when AP 106 successfully receives a packet, the AP 106 can enter a "silence" state to receive the broadcasting messages from its neighbor nodes 102 to maintain its neighbor list. For example, as shown in FIG. 4, during the silence state the AP 106 can receive RTS messages and neighbor advertisements as discussed above from New Neighbor 1 so that the AP 106 can add information pertaining to this new neighbor to its neighbor list.

In this example, AP 106 then polls Neighbor 2 by transmitting an RRTS message to Neighbor 2. However, Neighbor 2 does not have a message to send to AP 106 at this time, and therefore responds with a reverse not clear to send (RNCTS) message.

Upon receiving the RNCTS message, AP 106 polls Neighbor 3 by sending an RRTS message to Neighbor 3. In this example, Neighbor 3 has a message to send. Therefore, in a manner similar to that discussed above with regard to Neighbor 1, Neighbor 3 replies with a RCTS message to the AP 106. Following the RCTS message, Neighbor 3 transmits the data packet message (MSG). If the AP 106 successfully receives the packet, the AP 106 replies to Neighbor 3 with an ACK message.

As further shown, the AP 106 can again enter a "silence" state to receive the broadcasting messages from its neighbor nodes 102 to maintain its neighbor list. For example, as shown in FIG. 4, during the silence state the AP 106 can receive RTS messages and neighbor advertisements as discussed above from New Neighbor 2 so that the AP 106 can add information pertaining to this new neighbor to its routing table.

The AP 106 then continues the polling process. In this example, the AP 106 transmits an RRTS message to Neighbor 4, but Neighbor 4 is busy, or out of the range, and ignores the RRTS message.

As further shown in this example, AP 106 polls Neighbor 5 by sending an RRTS message to Neighbor 5. In this example, Neighbor 5 has a message to send. Therefore, in a manner similar to that discussed above with regard to Neighbors 1 and 3, Neighbor 5 replies with a RCTS message to the AP 106. Following the RCTS message, Neighbor 5 transmits the data packet message (MSG). If the AP 106 successfully receives the packet, the AP 106 replies to Neighbor 5 with an ACK message.

The above polling process continues through Neighbor i, and then repeats beginning at Neighbor 1.

Also, AP 106 may pause the polling process if it needs to distribute some of the packets that it has collected. For example, when the number of packets accumulated in the AP 106 reaches threshold, the AP 106 starts transmitting traffic by sending a RTS to a destination node, which in this example is identified as Neighbor A. The AP 106 waits for a CTS message and, upon receipt of the CTS message, transmits its message MSG to Neighbor A, and then waits for an ACK message from Neighbor A. After the AP 106 clears its own traffic, or the number of packets remaining in node AP 106 is smaller than another threshold, the AP 106 resumes the polling process and polls the next neighbor node 102.

In accordance with another embodiment of the invention, a scheduling scheme is incorporated into the polling scheme. The scheduling scheme can be used to optimize the order in which the neighbor nodes 102 are polled and send their messages to the AP 106. By using different scheduling schemes in this polling process, the system and method can provide better fairness and QoS support.

In another embodiment applying weighted round-robin scheduling, the busy AP 106 may give extra weight or a higher priority to busy neighbor nodes 102 in the network. The basic process is similar to that used in round-robin polling; however, with a busy-node scheduling scheme, the AP 106 may poll busy neighbor nodes 102 multiple times in the same round of polling from neighbor 1 through neighbor i. For example, when the AP 106 successfully receives a packet from a busy neighbor node 102, the AP 106 can expect that there are more accumulated packets at that neighbor node 102, and the node may be allowed additional time to send its packets. The AP's neighbor nodes 102 can also inform the AP 106 as to how busy they are by reporting their backlogged traffic load in their RCTS messages. The AP 106 can then record the backlogged traffic load in its neighbor list and can weight the neighbor nodes differently based on their backlogged traffic load. The AP 106 can then give extra weight to the busy nodes when performing the polling process.

In another embodiment of the present invention, the polling scheme can be based on priority scheduling, such that the busy AP 106 may select the neighbor node 102 based upon the traffic type from that neighbor. For example, neighbor nodes 102 that are running real-time applications can be given a higher priority than neighbor nodes running non-real-time applications. That is, the basic process is similar to that used in round-robin polling discussed above, however, with a priority scheduling scheme, the AP 106 selects the neighbor node 102 from which to receive information based upon the type of traffic that its neighbor nodes 102 will send to the AP 106. The AP 106 uses historical data to determine the type of traffic that its neighbor nodes 102 have sent in the past, or it gets type of traffic information from the reporting field sent by its neighbor nodes 102, and then schedules the real-time traffic for receipt before non-real-time traffic. Also, the AP 106 can schedule periodic access for neighbor nodes 102 based on their QoS requirements, such as the requirements for the real-time traffic. For example, if the real-time traffic requires less than a 100 millisecond (ms) delay, AP 106 can select that neighbor node 102 every "n" ms, with "n" being less than 100 ms, to insure that the delay for that application will be less than 100 ms.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for communicating in a wireless network comprising a plurality of nodes and at least one access point for providing the nodes with access to another network, the method comprising:
    operating the access point to assign a respective priority level to each of the plurality of nodes based on at least one of an amount of traffic at the node and a quality of service associated with a type of the traffic at the node;
    operating the access point to transmit a query based on its own status, wherein the query is transmitted to one node of the plurality of nodes to determine if the node has information for transmission to the access point, wherein the access point queries the nodes having a higher priority more times than the nodes having a lower priority, wherein the query invites the node to initiate a transmission with the access point;
    operating the node, in response to the query, to send a message to the access point indicating whether it has information for transmission to the access point; and
    when the node sends the message to the access point indicating that it has information for transmission to the access point, operating the node to transmit the information to the access point.

2. A method as claimed in claim 1, further comprising:
    when the node receives the query message and the node has packets for transmission to the access point, operating the node to send a positive acknowledgement message as the message to the access point followed by a packet to the access point.

3. A method as claimed in claim 1, further comprising:
    when the node receives the query message and the node does not have packets for transmission to the access point, operating the node to send a negative acknowledgement message as the message to the access point to terminate current query activity with the node.

4. A method as claimed in claim 1, further comprising:
    operating the access point to receive a message from one of the nodes including information pertaining to that node; and operating the access point to retain the information pertaining to that node.

5. A method as claimed in claim 1, further comprising:
operating the access point to transmit information to at least one of the nodes.

6. A method as claimed in claim 1, further comprising:
operating the access point and the nodes to communicate using a multi-channel medium access control (MAC) protocol;
operating the access point to include channel selection information in a query message used to query each of the plurality of nodes; and
operating the node that sends the message to the access point indicating that it has information for transmission to the access point to include a positive acknowledgement message and the channel selection confirmation information for the query in the message.

7. An access point, operating within a wireless network comprising a plurality of nodes, to provide the nodes with access to another network, the access point comprising:
a transceiver; and
a controller, for
assigning a respective priority level to each of the plurality of nodes based on at least one of an amount of traffic at the node and a quality of service associated with a type of the traffic at the node, and
controlling the transceiver to transmit a query based on a status of the access point, wherein the query is transmitted to one node of the plurality of nodes to determine if the node has information for transmission to the access point, wherein the nodes having a higher priority are queried more times than the nodes having a lower priority, wherein the query invites the node to initiate a transmission with the access point, and
when the transceiver receives a message from the node indicating that the node has information for transmission to the access point, controlling the transceiver to receive the information transmitted by the node.

8. An access point as claimed in claim 7, wherein:
the controller further controls the transceiver to receive a positive acknowledgement message as the message, followed by a packet, that were transmitted by the node when the node receives the query message and the node has packets for transmission to the access point.

9. An access point as claimed in claim 7, wherein:
the controller further controls the transceiver to receive a negative acknowledgement message as the message transmitted by the node when the node receives the query message and the node does not have packets for transmission to the access point, and the controller further operates to terminate current query activity with that node in response to the negative acknowledgment message.

10. An access point as claimed in claim 7, wherein:
the controller further controls the transceiver to receive a message from one of the nodes including information pertaining to that node, and the controller operates to store the information pertaining to that node in a memory at the access point.

11. An access point as claimed in claim 7, wherein:
the controller further controls the transceiver to transmit information to at least one of the nodes.

12. An access point as claimed in claim 7, wherein:
the access point and the nodes communicate using a multi-channel medium access control (MAC) protocol;
and the method further comprises operating the access point to include channel selection information in a query message used to query each of the plurality of nodes.

13. A wireless communication network comprising:
a plurality of nodes; and
at least one access point, operating to provide the nodes with access to another network;
the access point operating to assign a respective priority level to each of the plurality of nodes based on at least one of an amount of traffic at the node and a quality of service associated with a type of the traffic at the node;
the access point further operating to transmit a query based on its own status, wherein the query is transmitted to one node of the plurality of nodes to determine if the node has information for transmission to the access point, wherein the access point queries the nodes having a higher priority more times than the nodes having a lower priority, wherein the query invites the node to initiate a transmission with the access point; and
the node operating, in response to the query, to send a message to the access point indicating whether it has information for transmission to the access point.

14. A wireless communication network as claimed in claim 13, wherein:
the access point and the nodes communicate using a multi-channel medium access control (MAC) protocol.

15. A method for communicating between an access point and a plurality of nodes in a multi-hopping wireless network with multi-channel media access control (MAC), the method comprising:
operating the access point to:
consecutively poll each of a plurality of neighbor nodes using a round-robin polling scheme to determine which of the plurality of neighbor nodes has information for transmission to the access point;
operating each node, in response to receiving a query to:
reply with a reverse clear to send message and thereafter transmit a data packet message when the node is free and has information for transmission to the access point, wherein the received query is a reverse request to send message, inviting the node to initiate transmission with the access point; and
reply with a reverse not clear to send message when the node does not have information for transmission to the access point.

16. A method as claimed in claim 15, wherein the round-robin polling scheme includes a weighted round-robin scheduling, the method further comprising:
operating the access point to:
assign a respective priority level to each of the plurality of nodes based on at least one of an amount of traffic at the node, a type of traffic at the node and a quality of service of the traffic at the node, and
poll the nodes having a higher priority more times than the nodes having a lower priority.

* * * * *